(12) United States Patent
Thibeault et al.

(10) Patent No.: US 9,940,574 B1
(45) Date of Patent: Apr. 10, 2018

(54) SYSTEM AND METHOD TO CONTROL A MODEL STATE OF A NEUROMORPHIC MODEL OF A BRAIN

(71) Applicant: HRL Laboratories, LLC, Malibu, CA (US)

(72) Inventors: Corey M Thibeault, Valley Village, CA (US); Narayan Srinivasa, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 717 days.

(21) Appl. No.: 14/248,297

(22) Filed: Apr. 8, 2014

Related U.S. Application Data

(60) Provisional application No. 61/839,841, filed on Jun. 26, 2013.

(51) Int. Cl.
*G06E 1/00* (2006.01)
*G06N 3/08* (2006.01)
*G06N 3/02* (2006.01)

(52) U.S. Cl.
CPC ............... *G06N 3/08* (2013.01); *G06N 3/02* (2013.01)

(58) Field of Classification Search
CPC ........................................... G06N 3/02
USPC ............................... 706/1, 15, 45
See application file for complete search history.

(56) References Cited

U.S. PATENT DOCUMENTS

| | | | |
|---|---|---|---|
| 5,274,748 A | 12/1993 | Boser et al. | |
| 8,588,899 B2 | 11/2013 | Schiff | |
| 8,930,291 B1* | 1/2015 | Srinivasa | G06N 3/049 706/12 |
| 8,959,040 B1* | 2/2015 | Cruz-Albrecht | G06N 3/049 706/39 |
| 8,977,578 B1 | 3/2015 | Cruz-Albrecht et al. | |
| 9,275,328 B1 | 3/2016 | Minkovich et al. | |
| 9,412,051 B1 | 8/2016 | Chelian et al. | |
| 2015/0302296 A1* | 10/2015 | Thibeault | G06N 3/049 706/25 |

OTHER PUBLICATIONS

Agarwal12, "The Eects of DBS Patterns on Basal Ganglia Activity and Thalamic Relay a Computational Study", www.springerlink.com [online], Dec. 19, 2011 [retrieved on Jun. 2, 2016]. Retrieved from the Internet <URL:http://armalab.icm.jhu.edu/sites/default/files/jcn_dec1_rahul.pdf>.*

(Continued)

*Primary Examiner* — David R Vincent
(74) *Attorney, Agent, or Firm* — North Shore Associates

(57) ABSTRACT

Model-based neural control uses a model of a portion of a brain and provides feedback control to the model that is based on a received output from the model. A neuromorphic model-based control system includes a neuromorphic model that includes a neuromorphic network to model the brain portion. A synaptic time-multiplexed (STM) neural model-based control system includes an STM neural network to the model the brain portion. The control systems further include a feedback controller to receive an output of the neuromorphic model or STM neural network and to provide a feedback control input to control a model state of the neuromorphic model or the STM neural network.

23 Claims, 5 Drawing Sheets

(56) References Cited

OTHER PUBLICATIONS

Minkovich et al. (Minkovich12), Programming Time-Multiplexed Reconfigurable Hardware Using a Scalable Neuromorphic Compiler, IEEE Transactions on Neural Networks and Learning Systems, vol. 23, No. 6 [online], Jun. 2012 [retrieved on Jun. 2, 2016]. Retrieved from the Internet <URL:http://ieeexplore.ieee.org/stamp/stamp.jsp?tp=&arnumber=6182588>.*
Katz, Tritonia swim network, 2009, Scholarpedia.*
Kravitz et al., Regulation of parkinsonian motor behaviors by optogenetic control of basal ganglia circuitry, 2010, NIH, pp. 1-11.*
Indiveri et al., "Neuromorphic silicon neuron circuits," Frontiers Neurosci., vol. 5, No. 73, pp. 1-23, 2011.
Srinivasa et al., "Analog learning systems of neuromorphic adaptive plastic scalable electronics," IEEE Pulse, vol. 3, No. 1, Jan.-Feb., pp. 51-56, 2012.
Bi et al., "Activity-induced synaptic modifications in hippocampal culture: Dependence on spike timing, synaptic strength and cell type," J. Neurosci. vol. 18, No. 24, pp. 10464-10472, 1998.
Izhikevich, "Polychronization: Computation with spikes," Neural Comput., vol. 18, No. 2, pp. 245-282, 2006.
Izhikevich et al., "Spike-timing Dynamics of Neuronal Groups," Cerebral Cortex, vol. 14, No. 8, pp. 933-944, 2004.
Chen et al., "Real-time simulation of biologically realistic stochastic, neurons in VLSI," IEEE Trans. Neural Netw., vol. 21, No. 9, pp. 1511-1517, Sep. 2010.
Khan et al., "SpiNNaker: Mapping neural networks onto a massively-parallel chip multiprocessor," in Proc. IEEE Int. Joint Conf. Neural Netw. World Congr. Comput. Intell., Jun. 2008, pp. 2849-2856.
Schemmel et al., "Implementing synaptic plasticity in a VLSI spiking neural network model," in Proc. Int. Joint Conf. Neural Netw., 2006, pp. 1-6.
Schemmel et al., "A wafer-scale neuromorphic hardware system for large-scale neural modeling," in Proc. IEEE Int. Symp. Circuits Syst., May-Jun. 2010, pp. 1947-1950.
Hodgkin et al., "A quantitative description of membrane current and application to conduction and excitation in nerve," J. Phys., vol. 117, No. 4, pp. 500-544, 1952.
Izhikevich, "Which model to use for cortical spiking neurons?" IEEE Trans. Neural Netw., vol. 15, No. 5, pp. 1063-1070, Sep. 2004.
Fitzhugh, "Impulses and physiological states in theoretical models of nerve membrane," Biophys. J., vol. 1, No. 6, pp. 445-466, 1961.
Brette et al., "Adaptive exponential integrate and fire model as an effective description of neuronal activity," J. Neurophys., vol. 94, No. 5, pp. 3637-3642, 2005.
Song et al., "Competitive Hebbian Learning Through Spike-Timing Dependent Synaptic Plasticity," Nature Neuroscience, vol. 3, 2000, pp. 919-926.
Fuhrmann et al., "Spike frequency adaptation and neocortical rhythms," J. Neurophys., vol. 88, No. 2, pp. 761-770, 2002.
Wu et al., "Contribution of AMPA, NMDA, and GABA(A) receptors to temporal pattern of postsynaptic responses in the inferior colliculus of the rat," J. Neurosci., vol. 24, No. 19, pp. 4625-4634, 2004.
Minkovich et al., "Programming Time-Multiplexed Reconfigurable Hardware Using a Scalable Neuromorphic Compiler," IEEE Trans. on Neural Networks and Learning Systems, vol. 23, No. 6, Jun. 2012, pp. 889-910.
Gorzelic et al., "Model-based rational feedback controller design for closed-loop deep brain stimulation of Parkinson's disease," J. Neural Eng., vol. 10, 2013, pp. 026016-1 to 026016-16.
Schiff et al., Towards model-based control of parkinson's disease. Philosophical Transactions of the Royal Society A: Mathematical, Physical and Engineering Sciences, 368, 2010, pp. 2269-2308.
Dethier et al., "A Brain-Machine Interface Operating with a Real-Time Spiking Neural Network Control Algorithm," Advances in Neural Information Processing Systems 24, 2012, pp. 2213-2221.
Santaniello et al., "Adaptive feedback control in deep brain stimulation: a simulation study," 17th IFAC World Congress, Seoul, Korea, Jul. 6-11, 2008, pp. 116254-11629.
Little et al., "What brain signals are suitable for feedback control of deep brain stimulation in Parkinson's disease?," Ann. N.Y. Acad. Sci., vol. 1265, 2012, pp. 9-24.
Rubin et al., "High frequency stimulation of the subthalamic nucleus eliminates pathological thalamic rhythmicity in a computational model," Journal of Computational Neuroscience, vol. 16(3), 2004, pp. 211-235.
Abarbanel et al., "Estimation of parameters in nonlinear systems using balanced synchronization," Phys. Rev. E 77, 2008, 016208, pp. 1-14.
Agarwal et al., "The effects of dbs patterns on basal ganglia activity and thalamic relay," J. of Computational Neuroscience, 33, 2012, pp. 151-167.
Aprasoff et al., "Correlations in state space can cause sub-optimal adaptation of optimal feedback control models," J. of Computational Neuroscience, 32, 2012, pp. 297-307.
Cagnan et al., "Frequency-selectivity of a thalamocortical relay neuron during parkinsons disease and deep brain stimulation: a computational study," European Journal of Neuroscience, 30(7), 2009, pp. 1306-1317.
Dorval et al., "Deep brain stimulation alleviates parkinsonian bradykinesia by regularizing pallidal activity," J. of Neurophysiology, 104(2), 2010, pp. 911-921.
Feng et al, "Optimal deep brain stimulation of the subthalamic nucleusa computational study," J. of Computational Neuroscience, 23, 2007, pp. 265-282.
Frank et al., "Dynamic dopamine modulation in the basal ganglia: A neurocomputational account of cognitive deficits in medicated and nondedicated parkinsonism," J. of Cognitive Neuroscience 17(1), 2005, pp. 51-72.
Guo et al., "Multi-site stimulation of subthalamic nucleus diminishes thalamocortical relay errors in a biophysical network model," Neural Networks 24(6), 2011, pp. 602-616.
Guo et al., "Thalamocortical relay fidelity varies across subthalamic nucleus deep brain stimulation protocols in a data-driven computational models," Journal of Neurophysiology, 99(3), Mar. 2008, pp. 1477-1492.
Hahn et al., "Modeling shifts in the rate and pattern of subthalamopallidal network activity during deep brain stimulation," J. of Computional Neuroscience, 28, 2010, pp. 425-441.
Leblois et al., "Competition between feedback loops underlies normal and pathological dynamics in the basal ganglia," J. of Neuroscience, 26(13), 2006, pp. 3567-3583.
Meijer et al., "From parkinsonian thalamic activity to restoring thalamic relay using deep brain stimulation: new insights from computational modeling," J. of Neural Engineering, 8(6), 2011, 066005, pp. 1-13.
Pirini et al., "A computational modelling approach to investigate different targets in deep brain stimulation for parkinsons disease," J. of Computational Neuroscience, 26, 2009, pp. 91-107.
Rosin et al., "Closed-loop deep brain stimulation is superior in ameliorating parkinsonism," Neuron, 72(2), 2011, pp. 370-384.
Rubin et al., "Basal ganglia activity patterns in parkinsonism and computational modeling of their downstream effects," European Journal of Neuroscience 36(2), 2012, pp. 2213-2228.
Ullah et al., "Tracking and control of neuronal hodgkin-huxley dynamics," Phys. Rev. E, 79(4), Apr. 2009, 040901, pp. 1-4.
Ullah et al., "Assimilating seizure dynamics," PLoS Comput Biol, 6(5), May 2010, e1000776, pp. 1-12.
Voss et al., "Nonlinear dynamical system identification from uncertain and indirect measurements," I. J. Bifurcation and Chaos, 14(6), 2004, pp. 1905-1933.

* cited by examiner

SYSTEM AND METHOD TO CONTROL A MODEL STATE OF A NEUROMORPHIC MODEL OF A BRAIN

CROSS-REFERENCE TO RELATED APPLICATIONS

This application claims priority from U.S. Provisional Patent Application, Ser. No. 61/839,841, filed Jun. 26, 2013, the entire contents of which is incorporated herein by reference.

STATEMENT REGARDING FEDERALLY SPONSORED RESEARCH OR DEVELOPMENT

This invention was made with Government support under Contract No. HR0011-09-C-0001 awarded by DARPA. The Government has certain rights in the invention.

BACKGROUND

1. Technical Field

The invention relates to analog circuits, systems and related signal processing. In particular, the invention relates to elements and processing used in synapses of biologically inspired neuromorphic circuits and systems.

2. Description of Related Art

Complex, real-time and near real-time processing and control applications are becoming more commonplace and important. Examples include, but are not limited to, real-time image processing, as well as processing data, from a large array of sensors (e.g., a focal plane array of optical sensors) that may involve simultaneous processing of multiple, parallel channels from the sensor array. Such real-time processing often presents significant design challenges including, but not limited to, providing implementations that have sufficient processing power and at the same time exhibit reasonable energy efficiency. Neural networks, especially neural networks using neuromorphic circuits and related circuit topologies, may offer a solution to some of these significant obstacles associated with the design and implementation of real-time processing and control.

For example, neural models using neural and neuromorphic networks may have application in the treatment and control of various diseases and related conditions of the brain. In addition, neural models may have applications including, but not limited to, brain-computer interfaces. However, the challenge remains to develop practical implementations of large-scale neural and neuromorphic models and more particularly, low-power integrated circuit implementations thereof, that can be applied to real-time control and processing systems.

BRIEF SUMMARY

In some embodiments, a neuromorphic model-based control system is provided. The neuromorphic model-based control system comprises a neuromorphic model to model a portion of a brain. The neuromorphic model comprises a neuromorphic network having a plurality of neurons and associated synapses implemented as hardware-based circuits. The neuromorphic model-based control system further comprises a feedback controller to receive an output of the neuromorphic model and to provide a feedback control input to the neuromorphic model. The feedback control input is configured to control a model state of the neuromorphic model.

In some embodiments, a synaptic time-multiplexed (STM) neural model-based control system is provided. The STM neural model-based control system comprises an STM neural network to model a portion of a brain. The STM neural model-based control system further comprises a feedback controller to provide a feedback control input to the STM neural network. The feedback control input is configured to control a model state of the STM neural network.

In some embodiments, a method of neuromorphic model-based control is provided. The method of neuromorphic model-based control comprises receiving an output from a neuromorphic model of a portion of a brain. The neuromorphic model comprises a neuromorphic network having a plurality of neurons and associated synapses implemented as hardware-based circuits. The method of neuromorphic model-based control further comprises providing a feedback control input to the neuromorphic model using the received output. The feedback control input controls a model state of the neuromorphic model.

BRIEF DESCRIPTION OF THE DRAWINGS

Various features of embodiments in accordance with the principles described herein may be more readily understood with reference to the following detailed description taken in conjunction with the accompanying drawings, where like reference numerals designate like structural elements, and in which.

Figure 1A:
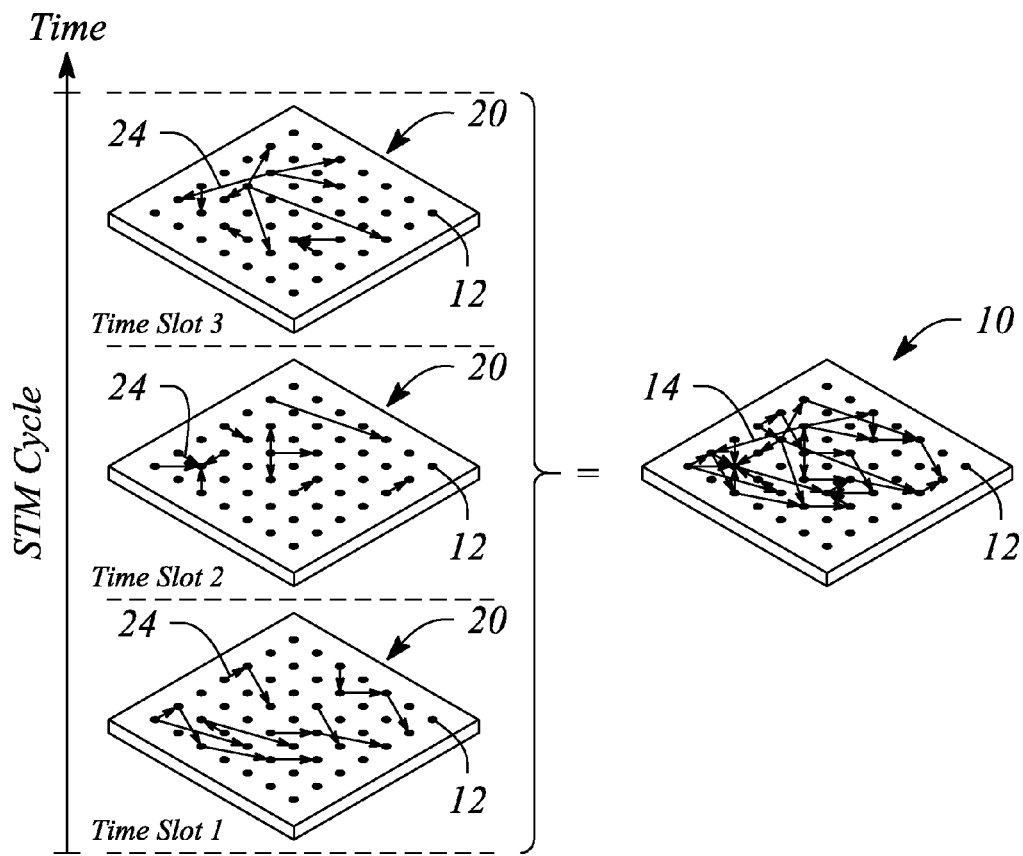
FIG. 1A illustrates a schematic representation of synaptic time multiplexing, according to an embodiment consistent with the principles of the present invention.

Certain examples and embodiments have other features that are one of in addition to and in lieu of the features illustrated in the above-referenced figures. These and other features are detailed below with reference to the above-referenced figures.

DETAILED DESCRIPTION

Embodiments consistent with the principles of the present invention provide feedback control of a model a brain or a portion thereof. In particular, embodiments of the present invention provide a model-based control using a neural model of a portion of the brain. The model-based control may provide closed-loop or feedback control of one or more model states of the neural model, according to various embodiments. For example, the model state may represent neural activity of a predetermined neural connection within the modeled portion of the brain. In some embodiments, the model-based control may be extended to controlling the brain itself. In other examples, the neural model may be adjusted or modified in response to measured activity of the brain. In some embodiments, the feedback control may be used in treating or controlling a disorder or diseased condition of the brain. For example, the feedback control provided by embodiments of the present invention may be employed in conjunction with deep brain stimulation to control symptoms of Parkinson's disease.

In some embodiments in accordance with the principles described herein, time multiplexing enables a limited plurality of physical or 'actual' connections within a network to provide a relatively larger number of virtual connections. The time-multiplexed connections typically involve synapses that serve as inputs of nodes within a neural network, such that the time multiplexing may be referred to as 'synaptic time multiplexing.' With synaptic time multiplexing, the ability to provide a relatively larger number of virtual connections may facilitate realizing a neural network with a much simpler architecture than without synaptic time multiplexing. For example, the neural network may be able to represent a functionality of a complex fully connected neural network with far fewer physical synapses than would be used in a neural network that does not employ synaptic time multiplexing. In some embodiments, a neural network that employs or is based on synaptic time multiplexing according to the principles described herein may yield neural or neuromorphic constructs which are highly scalable while simultaneously being practical to implement using available circuit technology.

As used herein, a 'neural network' is defined as a neuro-biologically inspired computational network configured to mimic characteristics of an interconnected network of biological neurons. In particular, by definition herein, a 'neural network' comprises a network of elements configured to mimic or represent neurons. The neurons are interconnected within the neural network by other elements configured to mimic or represent synapses. In general, a neural network may be implemented using software (i.e., executed by a processor), hardware-based circuits or a combination of software and hardware-based circuits, by definition herein.

Herein, 'neuron' is defined as a neural or neuromorphic construct that mimics or emulates the neuro-biological characteristics of a biological neuron. In various examples, the neuron may comprise any of a number of neuromorphic constructs including, but not limited to, a complimentary metal oxide semiconductor (CMOS) neuron circuit and a memristor-based neuron circuit. In other embodiments, the neuron may be a software-based neuron or a firmware-based neuron that, in whole or in part, employs a software simulation of the neuro-biological characteristics of the biological neuron.

In some examples, the neuron may be implemented based on a leaky integrate-and-fire neuron model that comprises a leaky integrator and is compatible with spike signals. Any of a variety of other neuron implementations including, but not limited to, a Hodgkin-Huxley neuron, Izhikevich neuron, and a current or conductance integrate and fire (e.g., an adaptive exponential integrate and fire model) neuron may be employed as the neuron herein, according to various examples. Further example neuron implementations may be found, for example, in FIG. 2 of E. M Izhikevich, "Which Model to Use for Cortical Spiking Neurons?," *IEEE Transactions on Neural Networks,* 15:1063-1070, 2004, incorporated by reference herein in its entirety.

A 'synapse', by definition herein, comprises a neural or neuromorphic construct that mimics or emulates the neuro-biological characteristics of a biological synapse. In a basic form, the synapse provides an interface between neurons. For example, the interface may merely translate signals from a received form to a form that is compatible with the neuron. In some embodiments, the synapse may comprise any of a number of neuromorphic constructs including, but not limited to, synapses based on CMOS circuitry. For example, the synapse may comprise CMOS circuitry and a learning module. The learning module may implement any of several different types of synaptic plasticity rules including, but not limited to, Hebbian plasticity, spike timing-dependent plasticity and short-term plasticity. In other embodiments, the synapse may be a software-based or a firmware-based synapse that, in whole or in part, employs a software simulation or a firmware simulation of the neuro-biological characteristics of the biological synapse (e.g., to implement one or both of synapse circuitry and the learning module).

Further herein, a 'neuromorphic network' is defined as neural network that is implemented comprising hardware-based circuits. For example, one or both of a neuron and a synapse may be implemented using hardware-based circuits in a neuromorphic network, by definition. In particular, the term 'neuromorphic network' refers exclusively to embodiments that include at least some elements comprising hardware-based circuits, while the term 'neural network,' as used herein, may refer to embodiments having either a purely software implementation or an implementation in which one or more elements (e.g., neurons, synapses, etc.) comprise hardware-based circuits. As such, reference to the term 'neural network' may include, by definition, a 'neuromorphic network.' On the other hand, reference to a 'neuromorphic network' explicitly precludes embodiments made up of elements that are implemented purely by software that is executed by a processor, by definition herein. For simplicity of discussion herein, generally the term 'neural network' will be employed unless a distinction in implementation is necessary for proper understanding.

By definition herein, a 'synaptic time-multiplexed neural network' represents a complete or fully connected neural network as a sequence or series of decoupled sub-networks. Further, by definition herein, the decoupled sub-network provides a subset of connections of a set of connections that are present in the fully connected neural network. In some embodiments, each of the decoupled sub-networks provides a subset of the set of connections of the fully connected neural network. The decoupled sub-networks combine during time multiplexing to achieve the connectivity and functionality of the fully connected neural network. Further by definition herein, a 'synaptic time-multiplexed neuromorphic network' is a synaptic time-multiplexed neural network implemented using a neuromorphic network (i.e., an implementation comprising hardware-based circuits).

According to various embodiments, synaptic time multiplexing divides or breaks down the fully connected neural network into a plurality of decoupled sub-networks. The plurality of decoupled sub-networks comprises all of a plurality of nodes that make up the fully connected neural network. A 'node' is defined as a combination of a neuron and one or more associated synapses. However, each of the decoupled sub-networks comprises only a subset of a set of connections between nodes represented by the fully connected neural network. Synaptic time multiplexing further forms the fully connected neural network as a time series of the various decoupled sub-networks. In particular, synaptic time multiplexing forms the decoupled sub-networks in different time slots of a synaptic time multiplexing cycle. In some embodiments, each of the decoupled sub-networks is formed in a different time slot of the cycle. When the synaptic time multiplexing cycle is completed, all of the decoupled sub-networks have been formed. Moreover, when combined over a period of the synaptic time multiplexing cycle, the decoupled sub-networks and their respective subsets of connections produce the fully connected neural network.

FIG. 1A illustrates a schematic representation of synaptic time multiplexing, according to an embodiment consistent with the principles of the present invention. In particular, a right side of FIG. 1A illustrates a fully connected neural network 10 in terms of nodes 12 and a set of connections 14 between nodes. A left side of FIG. 1A illustrates three decoupled sub-networks 20, by way of example. A sub-network 20 comprises the nodes 12 of the fully connected neural network. Further, the sub-network 20 comprises a subset of the connections 24 in the fully connected neural network 10. For example, the respective subset of the connections 24 may be different for each sub-network 20. Combined, the connections 24 of the subsets equal the set of the connections 14 of the fully connected neural network 10 as indicated by an equal sign ('=') in FIG. 1A. Moreover, the subsets of the connections 24 illustrated in FIG. 1A may be executed or otherwise formed during separate time slots of a synaptic time multiplexing (STM) cycle (e.g., time slots 1, 2 and 3, as illustrated). When combined or summed together, the subsets of connections 24 formed during the separate time slots produce all of the connections 14 of the set in the fully connected neural network 10. As such, once every synaptic time multiplexing (STM) cycle, the fully connected neural network 10 may be realized by the sequential formation of the subsets of connections 24 represented by the decoupled sub-networks 20.

Figure 1B:
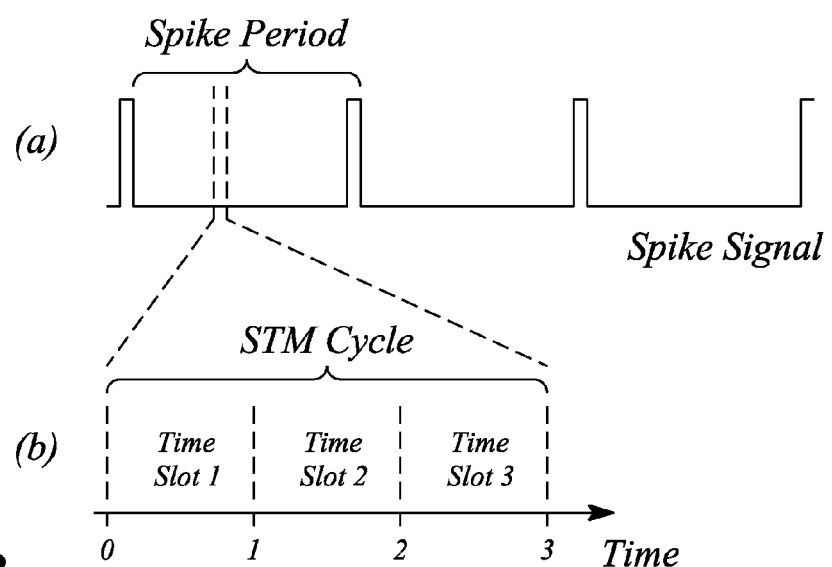
FIG. 1B illustrates a graphical representation of a synaptic time multiplexing cycle, according to an embodiment consistent with the principles of the present invention.

FIG. 1B illustrates a graphical representation of a synaptic time multiplexing cycle, according to an embodiment consistent with the principles of the present invention. Also illustrated is a plot of an example spike signal. In particular, an upper portion of FIG. 1B labeled (a) illustrates the spike signal having a spike period and a lower portion of FIG. 1B labeled (b) illustrates a synaptic time multiplexing (STM) cycle of the spike period. The synaptic time multiplexing cycle includes three time slots, as illustrated by way of example. The three time slots may be the time slots during which the decoupled sub-networks 20 of FIG. 1A are formed. For example, during a first time slot (e.g., time slot 1) of FIG. 1B, a first decoupled sub-network 20 (or e.g., connections 24 thereof) may be formed. Then, during a second time slot (e.g., time slot 2) and a third time slot (e.g., time slot 3) of FIG. 1B, a second decoupled sub-network 20 and third decoupled sub-network 20, respectively, (or e.g., respective connections 24 thereof) of FIG. 1A may be formed, for example. At an end of the synaptic time multiplexing cycle, all of decoupled sub-networks, and by extension all of the subsets of connections 24, have been formed such that all of the connections 14 of the fully connected neural network 10 have been formed. Further, the synaptic time multiplexing cycle ('STM cycle') is a fraction of the spike period of the spike signal, as illustrated in FIG. 1B. According to various examples, the synaptic time multiplexing cycle may be repeated in each spike period and is timed to be completed during a spike of the spike signal. Further discussion of synaptic time multiplexing is provided by Minkovich et al., "Programming Time-Multiplexed Reconfigurable Hardware Using a Scalable Neuromorphic Compiler," *IEEE Trans. on Neural Networks and Learning Systems*, Vol. 23, No. 6, June 2012, pp. 889-910, incorporated herein by reference in its entirety.

According to various examples, circuits and systems that employ synaptic time multiplexing may transmit signals within and among elements of the circuits and systems as spike signals. Herein, a 'signal' is defined as a time varying quantity. Thus, a signal may be generally represented by a function of time t as S(t). However, in general herein, signals are represented without explicit reference to time for simplicity of notation and not by way of limitation. For example, the signal S(t) may be denoted or represented simply as 'S'. Herein, a 'spike signal', also referred to as an action potential, is defined herein as a signal that comprises two states as a function of time (t). According to some embodiments, a first state of the two states is referred to as a low or 'OFF' state and a second state of the two states is referred to as a high or 'ON' state, in some embodiments. In various examples, the states may represent one or both of voltage values or levels and current values or levels. For example, the first state may be a first voltage (e.g., 0 millivolts (mV)) and the second state may be second voltage (e.g., 1 mV). Alternatively, the states may be represented by values of current such that the first state is a first current (e.g., 0 microamps (µA)) and the second state is a second current (e.g., 10 µA). A spike signal in which the states are represented as voltage values may be referred as a 'voltage' spike signal. Similarly, a spike signal in which values of current represent the states may be referred to as a 'current' spike signal.

Further, a spike signal is generally characterized by being in or exhibiting one of the two states (e.g., the first or OFF state) for a majority of the time t with only brief transitions to the other state (e.g., the second or ON state), by definition herein. For example, the spike signal may exhibit a sequence of spikes of the ON state that are separated by relatively longer periods or inter-spike intervals (i.e., relative to a length of the spike) in the OFF state. According to various examples, a ratio of a length in time of a spike or 'spike time' to a length in time of an inter-spike interval or 'inter-spike interval time' is generally much less than one. In some embodiments, the ratio may be less than about 0.2. In some embodiments, the ratio is generally less than about 0.1 and may even be less than about 0.05. For example, the OFF state inter-spike interval time may be about 10 seconds (s) while the spike time of the ON state may have a length of about 1 second (s), for example. In another example, the ON state spike time may be about 0.1 s, while the OFF state inter-spike interval time between a pair of ON state spikes may be between about 1 s and about 10 s or more.

According to various examples, the spikes of the spike signal may be either aperiodic or periodic. For example, an aperiodic spike signal may comprise a series of spikes that occur at substantially random times or having substantially random inter-spike intervals. On the other hand, the spike signal may be a periodic spike signal that exhibits spikes at regular and repeating points in time. For example, a periodic spike signal may have a spike every 10 s. In another example, spikes may occur at intervals of about 5 s in another periodic spike signal. Such periodic spike signals are often said to have or exhibit a duty cycle. Herein, 'duty cycle' is defined in the usual sense as a ratio of a length of a spike to a time interval between spikes in a periodic spike signal.

Further, a periodic spike signal may be piece-wise or quasi-periodic, as used herein. In particular, the periodic spike signal may be periodic for only a finite and relatively short period of time. For example, the periodic spike signal may comprise a sequence of five or ten spikes in a periodic sequence. In another example, a periodic spike signal may comprise a finite sequence of periodic spikes (e.g., 5 spikes) followed by a relatively long interval of no spikes that may be further followed by another finite sequence of periodic spikes. The other finite sequence of periodic spikes may have the same number (e.g., 5) or a different number (e.g., 1, 2, 3, 4, 6, 7, 8, . . . ) of spikes, for example. In other embodiments, a duty cycle or equivalently an inter-spike interval of spikes of a periodic spike signal may vary as a function of time.

In some embodiments, spikes of a spike signal (either aperiodic or periodic) may occur asynchronously. By 'asynchronously' it is meant by definition that timing of a spike in the spike signal is not determined or otherwise tied to a particular clock signal. In particular, spikes of a pair of spike signals may be asynchronous with respect to one another. Timing of the spikes in the pair of asynchronous spike signals is or may be substantially uncorrelated between the pair. As such, spikes of a first spike signal of the pair may occur at any time relative to spikes of a second spike signal of the pair since the pair of spike signals are not tied to or otherwise regulated by a master clock signal.

Herein, 'spike timing dependent plasticity (STDP)' is defined as a characteristic that is observed in synapses in the brain generally involving an adjustment of the strength of a connection or 'synapse' between a pair of neurons. The adjustment may be defined by an STDP learning rule that establishes a variation in a synaptic conductance or weight w, based on a time difference (both positive and negative) or relative timing of input and output action potentials (i.e., spikes) at the synapse. The STDP learning rule relates a change $\Delta w$ in the synaptic conductance of a synapse that connects a pair of neurons to a timing difference ($\Delta t_{i,j} = t_i^{pre} - t_j^{post}$) between the output action potential of a pre-synaptic neuron ($t_i^{pre}$) and the input action potential of a post-synaptic neuron ($t_j^{post}$). In particular, as defined by the STDP learning rule, the synaptic conductance w undergoes depression according to an exponential decay of the right half of the STDP learning rule when the timing difference $\Delta t_{i,j}$ is positive. Alternatively, in response to a negative timing difference $\Delta t_{i,j}$, the synaptic conductance w undergoes potentiation according to an exponential decay of the left half of the STDP learning rule. The change or adjustment of the synaptic conductance w provided by the STDP learning rule may substantially mimic observed changes in the synaptic conductance w associated with synapses between neurons in the brain, according to some embodiments. A further discussion of the STDP learning rule may be found in Song et al., "Competitive Hebbian Learning Through Spike-Timing Dependent Synaptic Plasticity," *Nature Neuroscience*, Vol. 3, 2000, pp. 919-926, for example, incorporated herein by reference in its entirety.

Embodiments consistent with the principles described herein may be implemented using a variety of devices and circuits including, but not limited to, integrated circuits (ICs), very large scale integrated (VLSI) circuits, application specific integrated circuits (ASIC), field programmable gate arrays (FPGAs) and the like, firmware, software, and a combination of two or more of the above. For example, elements or 'blocks' of an apparatus consistent with the principles described herein may all be implemented as circuit elements within an ASIC or a VLSI circuit. Implementations that employ an ASIC or a VLSI circuit are examples of hardware-based circuit implementation, for example. In another example, the entire apparatus may be implemented as software using a computer programming language (e.g., C/C++) or software-based modeling environment (e.g., Matlab®, MathWorks, Inc., Natick, Mass.). Implementation of the entire apparatus as software is an example of a purely software implementation. In yet another example, some of the blocks may be implemented using actual circuitry (e.g., as an IC or an ASIC) while other blocks may be implemented in software or firmware. In particular, according to the definitions above, embodiments that explicitly include neuromorphic networks may be implemented using a substantially hardware-based circuit approach or device (e.g., ICs, VLSI, ASIC, firmware, etc.), while embodiments that include a neural network may also be implemented as software using a computer processor to execute the software, for example.

Further, as used herein, the article 'a' is intended to have its ordinary meaning in the patent arts, namely 'one or more'. For example, 'a neuron' means one or more neurons and as such, 'the neuron' means 'the neuron(s)' herein. Also, any reference herein to 'top', 'bottom', 'upper', 'lower', 'up', 'down', 'front', back', 'left' or 'right' is not intended to be a limitation herein. Herein, the term 'about' when applied to a value generally means within the tolerance range of the equipment used to produce the value, or in some examples, means plus or minus 20%, or plus or minus 10%, or plus or minus 5%, or plus or minus 1%, unless otherwise expressly specified. Moreover, examples and embodiments herein are intended to be illustrative only and are presented for discussion purposes and not by way of limitation.

Figure 2:
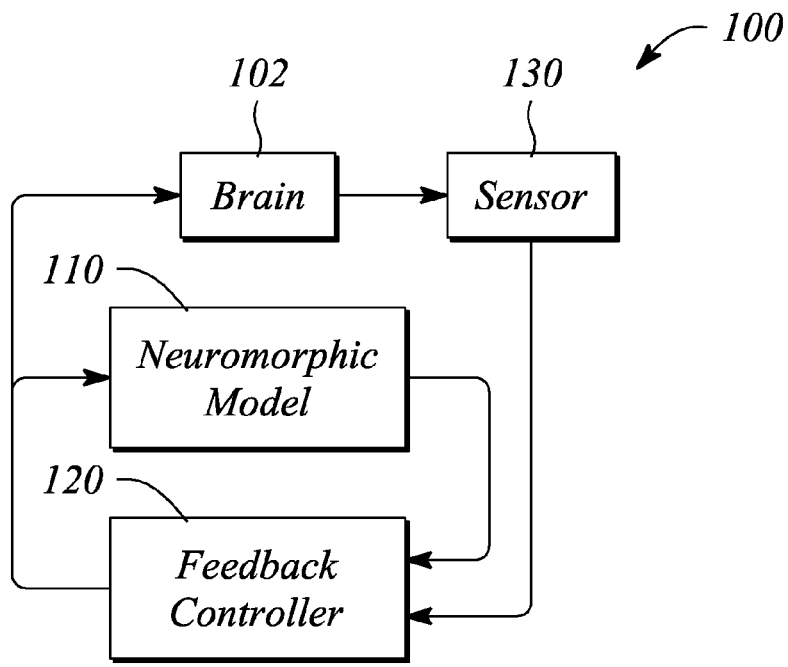
FIG. 2 illustrates a block diagram of a neuromorphic model-based control system, according to an embodiment consistent with the principles of the present invention.

FIG. 2 illustrates a block diagram of a neuromorphic model-based control system 100, according to an embodiment consistent with the principles of the present invention. According to various examples, the neuromorphic model-based control system 100 may provide feedback control of a model state of a model of a brain 102 or a portion thereof. A 'model state' is defined as a variable or parameter of a model (e.g., the brain model) and more particularly is a controllable variable or parameter of the model, as used herein. In some embodiments, the feedback control may further provide control inputs to the brain 102. In particular, the feedback control may be used to control a trajectory of the model state of brain model. Further, the feedback control may be applied to and used to control the modeled brain 102, according to some embodiments. In some examples, the feedback control may be used to modify a condition of the brain 102. For example, the feedback control may be used to modify, treat or control an abnormal condition of the brain 102. The feedback control may be used in conjunction with deep brain stimulation to treat a disease condition such as, but not limited to, Parkinson's Disease, for example.

As illustrated in FIG. 2, the neuromorphic model-based control system 100 comprises a neuromorphic model 110.

According to various embodiments, the neuromorphic model 110 has a plurality of neurons and associated synapses. For example, each neuron in the plurality may have one or more synapses associated with (e.g., connected to) the neuron. The associated synapses may act as inputs to the neuron, for example. In particular, the associated synapses facilitate interconnections between the neuron and other neurons in the neuromorphic model 110. As such, the synapses may represent axons or at least axonal terminations within the neuromorphic model 110.

According to some embodiments, the neurons of the plurality within the neuromorphic model 110 may be implemented as hardware-based circuits (e.g., see Minkovich et al., pending U.S. patent application Ser. No. 13/886,263 (filed May 2, 2013), incorporated by reference herein in its entirety). As such, the neuron of the neuromorphic model 110 may be a neuromorphic neuron, according to some examples. Similarly, the synapses that are associated with the neurons of the neuromorphic model 110 may be implemented as hardware-based circuits and thus be neuromorphic synapses, according to some embodiments. In some embodiments, implementation of both neurons and the associated synapses are hardware-based circuits. The term 'hardware-based circuits' is used herein to distinguish from software implementations of neurons, for example. Hardware-based circuits used to implement the neurons and associated synapses may include, but are not limited to, integrated circuits (ICs), very large scale integrated (VLSI) circuits, application specific integrated circuits (ASIC), field programmable gate arrays (FPGAs) and the like, firmware, and a combination of two or more of the above.

According to various embodiments, the neurons of the neuromorphic model 110 may be implemented based on any of a variety of neuron models that mimic the neuro-biological characteristics of the biological neuron. For example, neuron implementations including, but not limited to, a leaky integrate and fire neuron model, a Hodgkin-Huxley neuron, Izhikevich neuron, and a current or conductance integrate-and-fire (e.g., an adaptive exponential integrate and fire model) neuron may be employed as the neuron of the neuromorphic model 110, according to various examples. Similarly, synapses associated with the neurons of the neuromorphic model 110 may also be implemented according to any of a variety of different synapse implementations. In particular, the synapse may comprise any of a number of neural or neuromorphic constructs that include a learning module to implement any of several different types of synaptic plasticity rules including, but not limited to, Hebbian plasticity, spike timing-dependent plasticity and short-term plasticity.

In particular, in some embodiments, the learning module of the synapse may be implemented a synaptic spike timing dependent plasticity (STDP) learning rule. Such a synapse may be referred to as an STDP synapse. In some embodiments, the STDP synapse comprises a synapse core. The synapse core is configured to receive a pre-synaptic spike signal and to produce a weighted spike signal. In some embodiments, a pre-synaptic spike signal received by the synapse core is the pre-synaptic signal $V_{pre}$ provided by a pre-synaptic neuron. According to various examples, the weighted spike signal that is produced by the synapse core is weighted in accordance with a weight signal $W(t)$ that is based on the STDP learning rule. Further information regarding STDP synapses and implementations thereof is provided by Cruz-Albrecht et al., pending U.S. patent application Ser. No. 13/415,812 (filed Mar. 8, 2012), incorporated by reference herein in its entirety.

According to various embodiments, the neuromorphic model 110 is configured to model a portion of the brain 102. In particular, the neuromorphic model 110 may model substantially any portion of the brain 102, according to various embodiments. In some embodiments, the neuromorphic model 110 is organized or structured to mimic the modeled portion of the brain 102 in a physiologically consistent manner. In another example, the neuromorphic model 110 represents a functional model of the modeled portion of the brain without resorting to or relying on a physiologically consistent organization of elements within the neuromorphic model 110.

In some embodiments, the modeled portion of the brain 102 comprises basal ganglia. As such, the neuromorphic model 110 may be or represent a basal ganglia model, according to some embodiments. In particular, the neuromorphic model 110 may include neurons and associated synapses arranged to mimic various portions or regions of the basal ganglia in a physiologically consistent manner. For example, the neuromorphic model 110 may have subsets of neurons arranged to represent or mimic various physiologically distinct regions of the basal ganglia including, but not limited to, the subthalamic nucleus (STN), the external globus pallidus (GPe), the internal globus pallidus (GPi) and the thalamus (Th) of the brain 102. Similarly, the synapses of the neurons in each of the subsets representing the various physiologically distinct basal ganglia regions provide interconnections between these regions consistent with a physiological understanding of axonal interconnections of the basal ganglia.

Figure 3A:
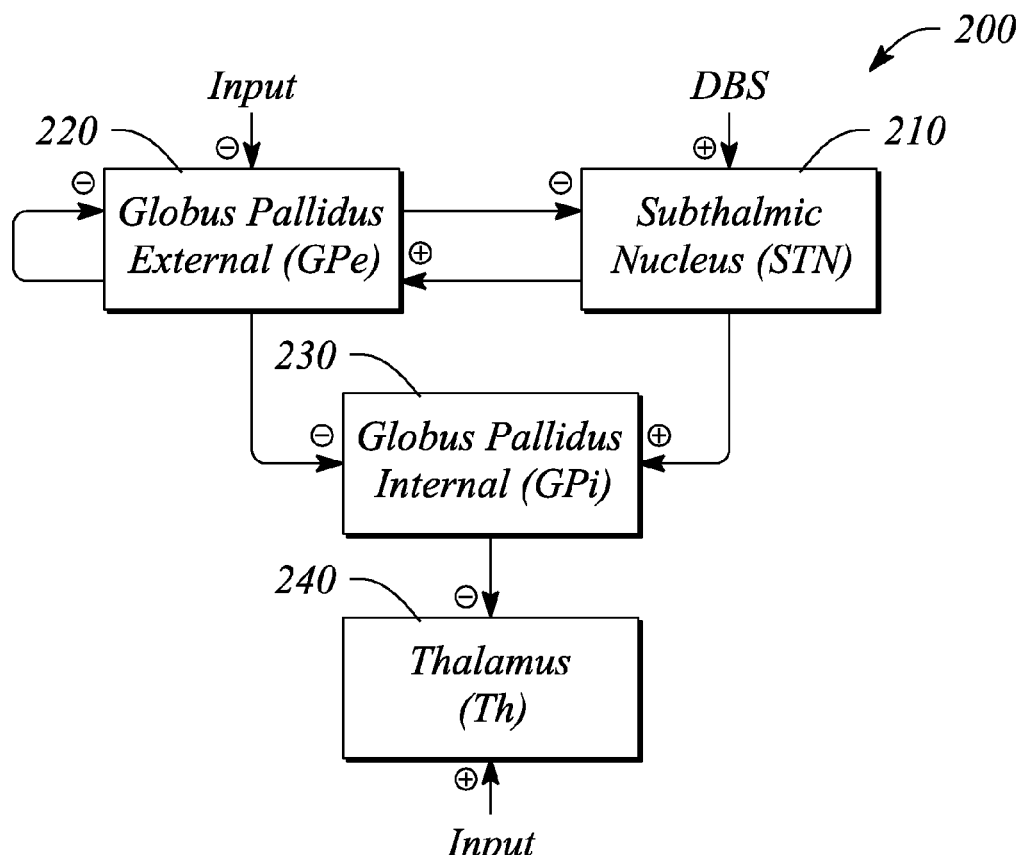
FIG. 3A illustrates a block diagram of a basal ganglia model, according to an embodiment consistent with the principles of the present invention.
Figure 3B:
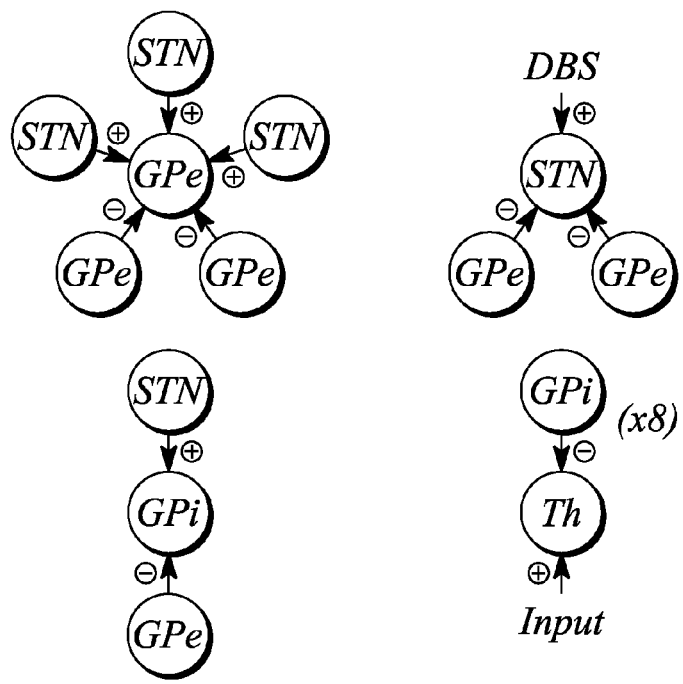
FIG. 3B illustrates a block diagram of individual neuron interconnections within the basal ganglia model of FIG. 3A, according to an embodiment consistent with the principles of the present invention.

FIG. 3A illustrates a block diagram of a basal ganglia model 200, according to an embodiment consistent with the principles of the present invention. FIG. 3B illustrates a block diagram of individual neuron interconnections within the basal ganglia model 200 of FIG. 3A, according to an embodiment consistent with the principles of the present invention. In particular, the block diagrams of FIGS. 3A-3B are based on a basal ganglia model described by Rubin, J. and D. Terman, "High frequency stimulation of the subthalamic nucleus eliminates pathological thalamic rhythmicity in a computational model," *Journal of Computational Neuroscience*, Vol. 16, No. 3, 2004, pp. 211-235, incorporated by reference herein. As illustrated in FIG. 3A, the basal ganglia model 200 comprises a subthalamic nucleus (STN) module 210, an external globus pallidus (GPe) module 220, an internal globus pallidus (GPi) module 230, and a thalamus (Th) module 240. In some examples, each of the STN module 210, the GPe module 220 and the GPi module 230 may contain 16 neurons, while the Th module 240 may contain 2 neurons, for example.

Arrows between modules in the block diagram of FIG. 3A illustrate interconnections (e.g., axons) between the various modules. Excitatory interconnections are illustrated by arrows labeled with a circled '+' and inhibitory interconnections are illustrated by arrows labeled with a circled '−' in FIG. 3A. The GPe module 220 also includes a self-generated inhibitory input (i.e., looped arrow labeled with a circled '−'). Inputs to the basal ganglia model 200 are illustrated as an inhibitory input labeled with a circled '−' applied to the GPe module 220 and an excitatory input labeled with a circled '+' applied to the Th module 240. An input to support deep brain stimulation (DBS) is also illustrated as an excitatory input labeled with a circled '+' at the STN module 210 in FIG. 3A. In FIG. 3B, representative neurons of the various modules 210, 220, 230, 240 are labeled in a manner corresponding to module membership. For example, a neuron labeled 'STN' represents a neuron of the STN module 210, while a neuron labeled 'GPe' represents a neuron of the GPe module 220, and so on, as illustrated in FIG. 3B and with reference to FIG. 3A.

Referring again to FIG. 2, the neuromorphic model-based control system 100 further comprises a feedback controller 120. The feedback controller 120 is configured to receive an output of the neuromorphic model 110. The received output may be one or more model states of the neuromorphic model 110, for example. The feedback controller 120 is further configured to provide a feedback control input to the neuromorphic model 110. According to various examples, the feedback control input is generated from the received output from the neuromorphic model 110. The feedback control input is configured to control a model state of the neuromorphic model 110. In particular, the feedback controller 120 may substantially implement model-based control of the neuromorphic model 110, according to various embodiments. In some embodiments, the feedback control input is also provided to the brain 102, as illustrated in FIG. 2. As such, the feedback controller 120 may further implement model-based control of the brain 120.

In general, the feedback controller 120 may provide the feedback control input according to any of a variety of feedback control approaches and methodologies to implement model-based control. For example, according to some embodiments, the feedback controller 120 is configured to implement (i.e., to provide the feedback control input according to) one or more of model predictive control, a Kalman filter or linear quadratic estimation (including ensemble, extended and unscented), a Bayes filter and a particle filter.

In some embodiments, the neuromorphic model-based control system 100 further comprises a sensor 130 connected between the brain 102 and an input of the feedback controller 120. The sensor 130 is configured to sense an output of the brain 102, according to some embodiments. For example, the sensor 130 may comprise a probe located in the brain 102. The probe may be located in a vicinity of the portion of the brain 102 to be modeled, for example. In some embodiments, the probe may be a pair of probes used in deep brain stimulation of the brain 102. The deep brain stimulation probe may be located in the basal ganglia, e.g., at or near the subthalamic nucleus. The sensor 130 provides an input to the feedback controller 120 based on a sensed output from the brain 102.

According to some embodiments, the feedback controller 120 is configured to adapt or modify the neuromorphic model according to the sensed output of the brain 102 provided from the sensor 130. For example, the feedback controller 120 may modify the neuromorphic model 110 by changing an input (e.g., an injected current) of the neuromorphic model 110 in response to the sensed output. In particular, the feedback control input may be generated in response to deep brain stimulation within the brain in a vicinity of the portion of the brain modeled by the neuromorphic model 110, for example. In turn, the feedback controller 120 may be configured to modify the neuromorphic model 110 according to the sensed output of the brain provided by the sensor 130 during the deep brain stimulation, for example, in a real-time feedback loop.

In some embodiments, the neuromorphic model 110 comprises a synaptic time multiplexed (STM) neuromorphic network. In particular, the neuromorphic model 110 may be implemented using an STM neuromorphic network to divide neuron interconnections represented by the neuromorphic model 110 into subsets of interconnections. The interconnection subsets are then assigned to and implemented during different time slots of a plurality of time slots of a time multiplexing cycle of the STM neuromorphic network. When the time multiplexing cycle is completed by the STM neuromorphic network, the STM neuromorphic network yields a fully connected neural network representing the full neuromorphic model 110, according to various embodiments.

Figure 4:
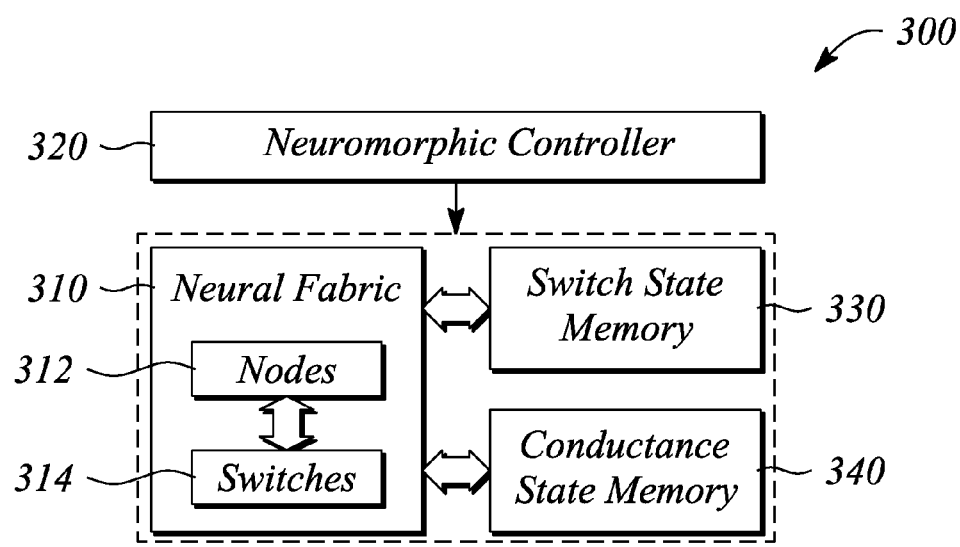
FIG. 4 illustrates a block diagram of a synaptic time-multiplexed (STM) neuromorphic network, according to an embodiment consistent with the principles of the present invention.

FIG. 4 illustrates a block diagram of a synaptic time-multiplexed (STM) neuromorphic network 300, according to an embodiment consistent with the principles of the present invention. The STM neuromorphic network 300 is configured to implement a fully connected neural network using time multiplexing. In particular, physical connections that provide signal pathways within the STM neuromorphic network 300 are time multiplexed to realize virtual connections. The virtual connections, when considered together as a set of connections, implement all of the connections of the fully connected neural network, according to various examples. Through time multiplexing, the STM neuromorphic network 300 may provide a set of connections that is much denser (e.g., contains higher connectivity, greater synaptic densities, etc.) than is possible without time multiplexing. In the neuromorphic model-based control system 100, the STM neuromorphic network 300 may facilitate realization of the neuromorphic model 110 with fewer physical neurons and fewer physical associated synapses than without the use of synaptic time multiplexing, according to some examples. Reducing a number of physical neurons and associated synapses may allow for a reduction in one or both of power utilization by and circuit size of the neuromorphic model 110, for example. Note that while illustrated as an STM neuromorphic network 300, the block diagram of FIG. 4 may also represent an STM neural network, according to some embodiments.

As illustrated, the STM neuromorphic network 300 comprises a neural fabric 310 having nodes 312 and switches 314 to define inter-nodal connections between selected nodes of the neural fabric 310. In particular, selective activation of the switches 314 defines an inter-nodal connection between a first node 312 and a second node 312 of the neural fabric 310. For example, the defined inter-nodal connection may be a connection between an output of the first node 312 and an input of the second node 312. The inter-nodal connection formed by the selective activation of the switches 314 may provide a signal pathway between the first and second nodes 312, for example. According to various examples, the selective activation may define multiple inter-nodal connections. Moreover, the inter-nodal connections are reconfigurable by virtue of the selective activation, according to various examples.

According to various embodiments, each node 312 of the neural fabric 310 comprises a neuron and an associated synapse. An output of the neuron is connected to an output of the node 312. According to various examples, the neuron of the node 312 may have between one and a plurality of different inputs or input ports to receive input signals. For example, a particular neuron may have one, two, three, four or more inputs. The input signal received by the neuron of the node 312 may take on any of several forms. For example, the input signal may be a spike signal. Likewise, the neuron may produce an output (i.e., an output signal) that has one of several forms including, but not limited to, a spike signal.

According to various examples, the node 312 further comprises a synapse that is associated with the neuron (i.e., an associated synapse). The synapse is connected between an input of the node 312 and an input of the neuron and is configured to provide an input signal to the neuron. For example, the synapse may serve as an interface between a neuron of the first node 312 and a neuron of the second node 312 as part of the inter-nodal connection formed by selective activation of the switches 314 of the plurality. The interface, in turn, may serve to communicate signals transmitted from the neuron of the first node 312 via the formed inter-nodal connection into the neuron of the second node 312, for example.

According to some embodiments, the node 312 may have one synapse connected to provide an interface to the neuron. In other embodiments, the node 312 may comprise a plurality of synapses. For example, there may be four synapses in the node 312. In other embodiments, the number of synapses of the plurality may be greater than or fewer than four synapses. Further, different nodes 312 in the neural fabric 310 may have different numbers of synapses as well as different numbers of synapses per neuron. For example, a first node 312 may have one synapse, a second node 312 may have four synapses 312, a third node 312 may have two synapses. As such, a number of synapses in a given node 312 may be arbitrary. In other embodiments, all nodes 312 of the neural fabric 310 may have substantially the same number of synapses per neuron. One or more of the synapses may be STDP synapses, according to some embodiments.

Figure 5:
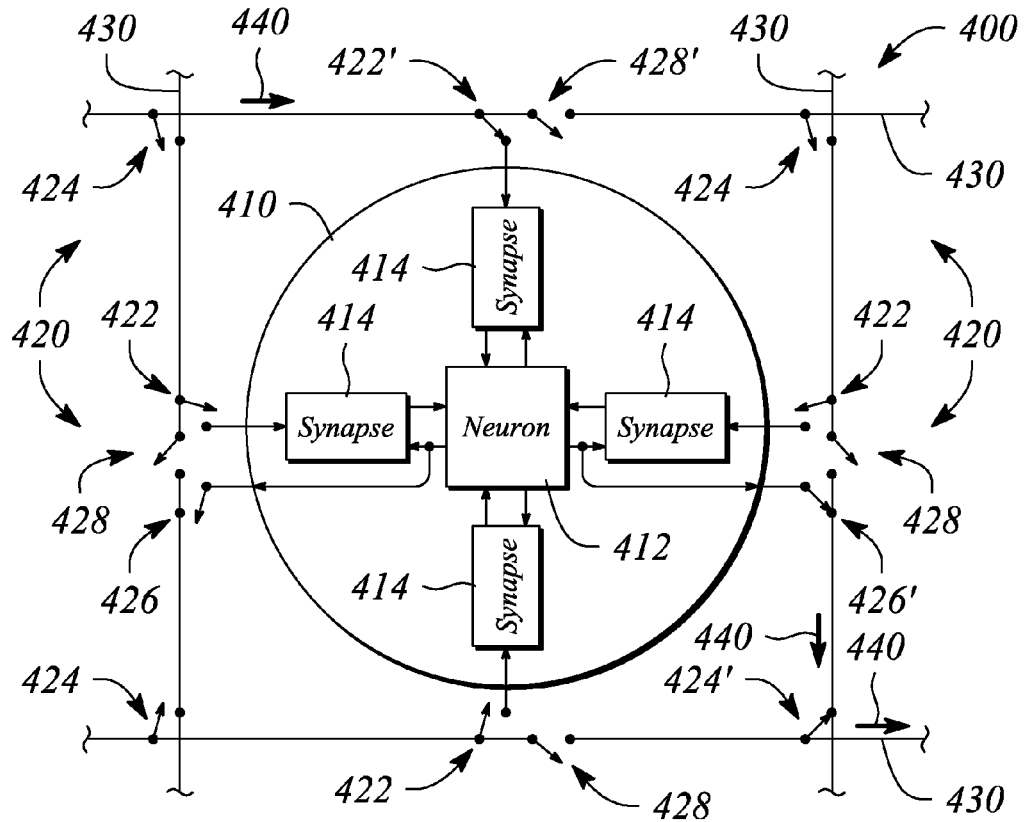
FIG. 5 illustrates a block diagram of a portion of a neural fabric, according to an embodiment consistent with the principles of the present invention.

FIG. 5 illustrates a block diagram of a portion of a neural fabric 400, according to an embodiment consistent with the principles of the present invention. In some embodiments, the neural fabric 400 may be substantially similar to the neural fabric 310 of the STM neuromorphic network 300, described herein. In particular, FIG. 5 illustrates a node 410 of the neural fabric 400. The node 410 comprises a neuron 412 surrounded by a plurality of synapses 414. Specifically as illustrated, the neuron 412 of the node 410 is surrounded by four synapses 414, by way of example and not limitation. In some embodiments, each of the synapses 414 is connected between an input of the node 410 and an input of the neuron 412. An output of the neuron 412 is connected to an output of the node 410 (illustrated at two places by way of example). In addition, neuron outputs may be connected to an input of each of the synapses 414, in some examples (e.g., as illustrated).

In some embodiments, the synapse inputs that are connected to the respective node inputs may receive a pre-synaptic signal from another node 410 (not illustrated in FIG. 5) in the neural fabric 400. The inputs of the synapses 414 that are connected to the outputs of the neuron 412 may receive a post-synaptic signal from the neuron 412. For example, when the synapses 414 are STDP synapses, the pre-synaptic signal may be the pre-synaptic signal $V_{pre}$ and the post-synaptic signal may be the post-synaptic spike signal $V_{post}$, described above with respect to the STDP learning module and STDP synapse.

Further illustrated in FIG. 5 is a plurality of switches 420. The plurality of switches 420 may be substantially similar to the plurality of switches 314 of the neural fabric 310, described above with respect to the STM neuromorphic network 300, according to some embodiments. In some embodiments, the plurality of switches 420 may comprise a node input switch 422 configured to selectively connect an adjacent signal path 430 to an input of the node 410. The signal path 430 may be a wire, a transmission line or a member of a signal transmission channel, according to various examples. As illustrated, the node 410 has four node input switches 422, one for each of four inputs to the node 410, for example. Selective activation of the node input switch 422' facilitates routing a signal 440 on the adjacent signal path 430 into the input of the node 410 and to a synapse 414 of the node 410. The signal 440 may be an input signal from another node, or an output signal produced by a neuron 412 of the node 410, as described further below.

In some embodiments, the plurality of switches 420 further comprises a diagonal switch 424. The diagonal switch 424 facilitates routing the signal 440 from a first signal path 430 to a second signal path 430. The first and second signal paths 430 may be substantially orthogonal to one another and cross each other in a vicinity of the diagonal switch 424, for example. When selective activation closes the diagonal switch 424', a connection may be formed between the first and second signal paths 430 allowing a signal to propagate from the first signal path 430 to the second signal path 430, for example.

In some embodiments, the plurality of switches 420 further comprises a node output signal switch 426. The node output signal switch 426 facilitates connecting an output of the node 410 to the signal path 430. In particular, when the node output signal switch 426' is closed, the signal 440 produced by a neuron 412 of the node 410 may be communicated to the signal path 430. The communicated signal 440 may be carried to and received by another node 410 of the neural fabric 400 by way of the signal path 430 and the node input switch 422 in cooperation with one or more diagonal switches 424, for example. Note that, for example, FIG. 5 illustrates switches 420 of the plurality that are activated, including a closed node input switch 422', a closed node output switch 426', and a closed diagonal switch 424'. When open, the switches are respectively referred to in FIG. 5 as switches 422, switches 426 and switches 424, for example. Collectively, the activated switches 420 transmit the signal 440 into and out of the node 410, as illustrated in FIG. 5.

In some embodiments, the plurality of switches 420 further comprises a signal path switch 428. The signal path switch 428 may facilitate the selective termination or continuation of the signal path 430 at a particular node 410. In particular, opening the signal path switch 428 may break the signal path 430 at a particular node to prevent the signal 440 from propagating further down the signal path 430. Alternatively, a closed signal path switch 428' continues the signal path 430. Closing the signal path switch 428' facilitates further propagation of the signal 440 to more than one node 410, for example.

In some embodiments, the nodes 410 of the neural fabric 400 are arranged in a two dimensional (2-D) array of nodes (not illustrated). In some embodiments, the neural fabric 400 further comprises a plurality of signal routing channels. For example, the signal routing channels may be interspersed in between nodes 410. The interspersed signal routing channels may form a grid such that the signal routing channels substantially surround or bound nodes 410 of the 2-D array on four sides. The switches 420 (e.g., the node input switches 422 and the node output switches 426) may connect between the signal routing channels and the nodes 410, in some embodiments. The connection provided by the switches 420 may facilitate communicating signals 440 into and out of the nodes 410. For example, the signal routing channels may comprise the signal paths 430 that are illustrated in FIG. 5.

Referring again to FIG. 4, the STM neuromorphic network 300 further comprises a neuromorphic controller 320. The neuromorphic controller 320 is configured to sequentially form subsets of a set of the inter-nodal connections within the STM neuromorphic network 300, wherein the set of inter-nodal connections represents a fully connected neural network. The subsets of inter-nodal connections may be provided by a particular configuration of the switches 420

(i.e., open vs. closed configuration) of the neural fabric 400 of FIG. 5, for example. The fully connected neural network may be the neuromorphic model, e.g., neuromorphic model 110, that the STM neuromorphic network 300 is programmed to implement, for example. In some embodiments, each subset of the set of inter-nodal connections is formed during a different time slot of a plurality of time slots of a cycle of the STM neuromorphic network 300. When combined, the inter-nodal connection subsets formed during the STM neuromorphic network cycle implements the fully connected neural network by time multiplexing the plurality of inter-nodal connections.

In some embodiments, the STM neuromorphic network 300 further comprises a switch state memory 330. The switch state memory 330 is configured to store a switch state of the plurality of switches 314. For example, the switch state memory 330 may store a state of each of the switches 314 corresponding to each time slot of the cycle. The switch state may define which switches 314 of the plurality are open and which switches 314 of the plurality are closed during a particular time slot, for example. The neuromorphic controller 320 may access the switch state memory 330 during each time slot to retrieve the switch state for the respective time slot. The neuromorphic controller 320 may then use the retrieved switch state to activate the switches 314 accordingly to establish which switches 314 are open and which are closed, for example. Sequential retrieval and use of the switch states enable the neuromorphic controller 320 to time multiplex the plurality of inter-nodal connections through the STM neuromorphic network cycle, according to various examples. In some embodiments, the switch state memory 330 may comprise a digital memory (e.g., a computer memory).

In some embodiments, the STM neuromorphic network 300 further comprises a conductance state memory 340. The conductance state memory 340 is configured to store a synapse conductance state of a synapse of a node 312. For example, the conductance state memory 340 may store conductance settings or states of each synapse in each node 312 of the STM neuromorphic network 300. Moreover, different conductance states for each synapse may be stored for, or correspond to, each time slot of the STM neuromorphic network cycle. In some embodiments, the conductance state may correspond to a weight signal W(t) for a synapse learning module of the synapse (e.g., an STDP learning module of an STDP synapse). In some embodiments, the conductance state memory 340 comprises an analog memory that stores analog values. In other embodiments, the conductance state memory 340 comprises a digital memory that store the conductance states as digital values. The digital values may be transformed into analog values, for example using a digital to analog converter (DAC), when retrieved during a time slot, in some embodiments. A more detailed discussion of STM neuromorphic networks as well as specifics regarding operational characteristics of neural fabrics employed in STM neuromorphic networks is provided by Cruz-Albrecht et al., pending U.S. patent application Ser. No. 13/535,114 (filed Jun. 27, 2012), incorporated by reference herein in its entirety.

Figure 6:
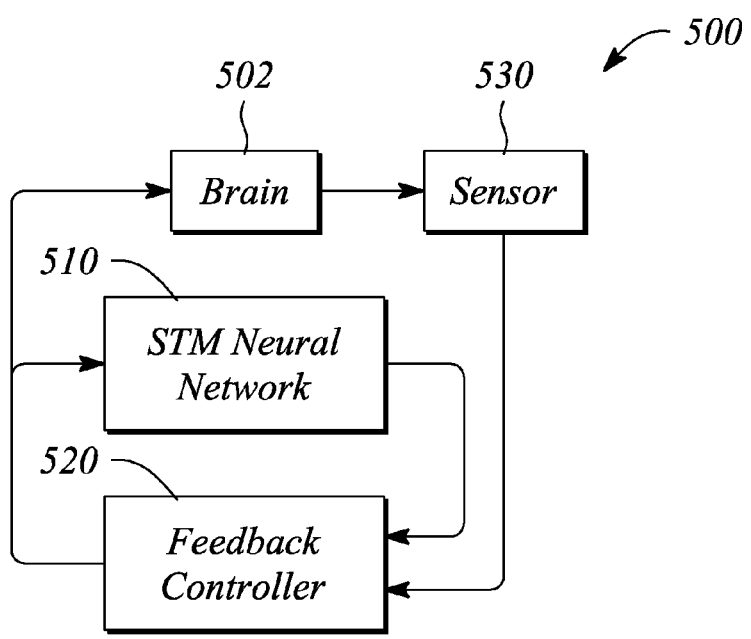
FIG. 6 illustrates a block diagram of a synaptic time-multiplexed (STM) neural model-based control system, according to an embodiment consistent with the principles of the present invention.

FIG. 6 illustrates a block diagram of a synaptic time-multiplexed (STM) neural model-based control system 500, according to an embodiment consistent with the principles of the present invention. According to various embodiments, the STM neural model-based control system 500 employs synaptic time multiplexing to implement a neural model used in a model-based control system to provide feedback control of a model state of a model of a brain 502 or a portion thereof. The synaptic time-multiplexing implementation may facilitate a reduction in one or both of physical size and amount of power used by the neural model compared to a model-based control system that does not use synaptic time multiplexing, for example. As a result, the STM neural model-based control system 500 may prove particularly useful in various applications where one or both of physical size and power consumption are critical (e.g., mobile applications).

As illustrated in FIG. 6, the STM neural model-based control system 500 comprises an STM neural network 510 configured to model a portion of the brain 502. In some embodiments, the STM neural network 510 is a synaptic time-multiplexed neural network implemented as software. For example, the STM neural network 510 may be provided as a processor executing a set of instructions stored in memory of a computer system. In other embodiments, the STM neural network 510 is substantially similar to the STM neuromorphic network 300 described above. Further, in some embodiments, the STM neural network 510 is substantially similar to the neuromorphic model 110 wherein the neuromorphic network comprises an STM neuromorphic network, as described above with respect to the neuromorphic model-based control system 100. However, whether implemented in software or hardware, the STM neural network 510 may have substantially the same functionality and operational characteristics as the above-described STM neuromorphic network 300 and the neuromorphic model 110, according to various embodiments.

In particular, in some embodiments, the STM neural network 510 comprises a neural fabric having nodes and further having switches to define inter-nodal connections between selected nodes of the neural fabric. The neural fabric may be either a data construct stored in a non-transitory memory or may comprise hardware-based circuits to implement one or more of various elements of the neural fabric, according to various embodiments. For example, a node of the neural fabric may comprise a neuron and a synapse, an output of the neuron being connected to an output of the node and the synapse being connected between an input of the node and an input of the neuron. One or both of the neuron and the synapse may be implemented either as a hardware-based circuit or using software, according to various examples. In some examples, the switches may also be implemented using either hardware-based circuitry or in software. Further, in some embodiments, the synapse may be configured to implement spike timing dependent plasticity.

In some embodiments, the STM neural network 510 further comprises a controller to form subsets of a set of the inter-nodal connections representing a fully connected neural network. Each subset is formed during a different time slot of a plurality of time slots of a time multiplexing cycle of the STM neural network 510. In combination, the inter-nodal connection subsets implement the fully connected neural network to provide the modeled portion of the brain 502, according to various embodiments.

In some embodiments, the portion of the brain 502 that is to be modeled by the STM neural network 510 comprises basal ganglia. As such, the STM neural network 510 may implement a basal ganglia model. In some embodiments, the basal ganglia model may be substantially similar to the basal ganglia model 200 described and illustrated with respect to FIGS. 3A and 3B above. In particular, the basal ganglia model may comprise modules or elements that represent or mimic various physiologically distinct regions of the brain's basal ganglia including, but not limited to, the subthalamic nucleus (STN), the external globus pallidus (GPe), the internal globus pallidus (GPi) and the thalamus (Th) of the brain 502, according to some embodiments.

As illustrated in FIG. 6, the STM model-based control system 500 further comprises a feedback controller 520 having an input connected to an output of the STM neural network 510 and an output connected to an input of the STM neural network 510 and an input to the brain 502. The feedback controller 520 is configured to provide a feedback control input to the STM neural network 510. In various embodiments, the feedback control input is to control a model state of the STM neural network 510. In some embodiments, the feedback control input is to further control the modeled portion of the brain 502. In some embodiments, the feedback controller 520 is substantially similar to the feedback controller 120 described above with respect to the neuromorphic model-based control system 100. In particular, in some embodiments, the feedback controller 520 is configured to implement one or more of a model predictive control system, a Kalman filter estimation, a Bayes filter and a particle filter.

In some embodiments, the STM neural model-based control system 500 further comprises a sensor 530 connected between the brain 502 and an input to the feedback controller 520. The sensor 530 is configured to sense an output of the brain 502 and provide that output to the feedback controller 520. In some embodiments, the sensor 530 is substantially similar to the sensor 130 described above with respect to the neuromorphic model-based control system 100. In particular, in some embodiments, the feedback controller 520 may be configured to adapt or modify the STM neural network 510 representing the modeled portion of the brain 502 according to the sensed output of the brain 502. In some embodiments, the feedback controller 520 may be configured to adapt or modify the brain 502 based on the feedback from the STM neural network 510 and from the sensor 530.

Figure 7:
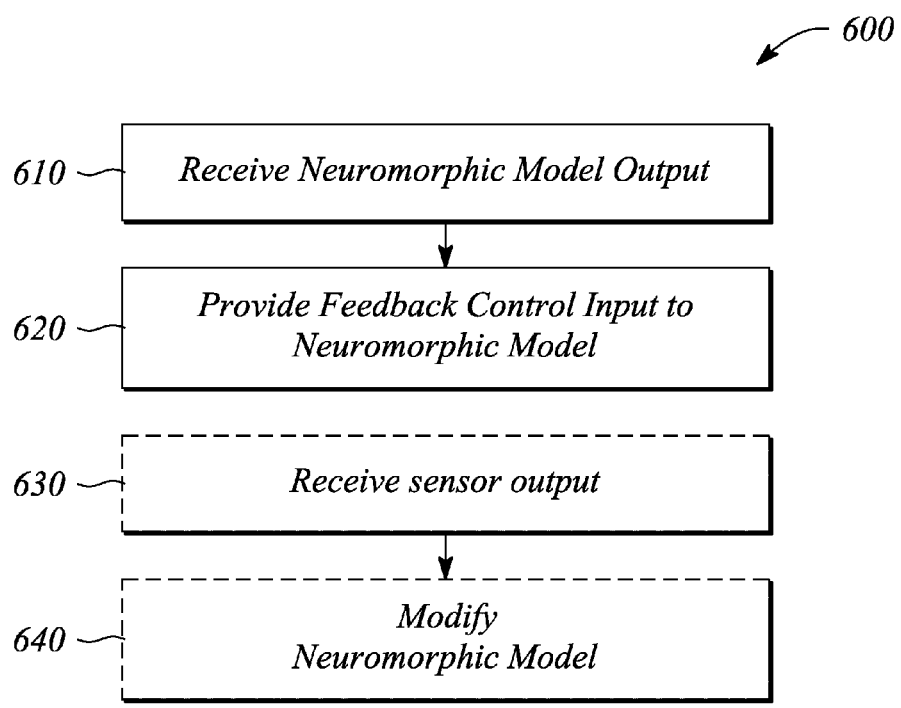
FIG. 7 illustrates a flow chart of a method of neuromorphic model-based control, according to an embodiment consistent with the principles of the present invention.

FIG. 7 illustrates a flow chart of a method 600 of neuromorphic model-based control, according to an embodiment consistent with the principles of the present invention. As illustrated in FIG. 7, the method 600 of neuromorphic model-based control comprises receiving 610 an output from a neuromorphic model of a portion of a brain. In some embodiments, the neuromorphic model may be substantially similar to the neuromorphic model 110 described above with respect to the neuromorphic model-based control system 100, for example. In particular, the neuromorphic model may comprise a neuromorphic network having a plurality of neurons and associated synapses implemented as hardware-based circuits, according to various examples. For example, neuromorphic model may be a basal ganglia model where the modeled portion of the brain comprises basal ganglia.

The method 600 of neuromorphic model-based control further comprises providing 620 a feedback control input to the neuromorphic model using the received output. In various examples, the feedback control input controls a model state of the neuromorphic model. In some examples, the feedback control input may be provided 620 by a feedback controller that is substantially similar to the feedback controller 110 described above with respect to the neuromorphic model-based control system 100. For example, the feedback control input may be generated by one or more of a model predictive control system, a Kalman filter estimation, a Bayes filter and a particle filter. In another example, the feedback control input may be generated using a proportional-integrate-derivative (PID) controller or any of a variety of other feedback control methodologies.

In some embodiments, the method 600 of neuromorphic model-based control further comprises receiving 630 an output of a sensor, wherein the sensor is connected to sense an output of the brain. In some embodiments, the sensor may be substantially similar to the sensor 130 described above with respect to the neuromorphic model-based control system 100.

In some embodiments, the method 600 of neuromorphic model-based control further comprises adapting or modifying 640 the neuromorphic model according to the received 630 output of the sensor. In some embodiments, the neuromorphic model is modified 640 by a feedback controller, such as is described above with respect to the feedback controller 120 of the neuromorphic model-based control system 100, for example. In particular, the feedback control input may be provided in response to deep brain stimulation within the brain in a vicinity of the brain portion modeled by the neuromorphic model. The neuromorphic model may be modified 640 according to the received 630 output from the sensor during the deep brain stimulation, for example.

Note that both of receiving 630 an output of a sensor and modifying 640 the neuromorphic model are optional as illustrated by dashed lines in FIG. 7. Further, receiving 630 the sensor output and modifying the neuromorphic model may be performed substantially independently of (e.g., out of sequence with respect to) receiving 610 the neuromorphic model output and providing 620 the feedback control input, as illustrated by a gap between blocks labeled 610 and 620 and blocks labeled 630 and 640 in FIG. 7.

In some embodiments, the neuromorphic network of the neuromorphic model (e.g., in 610, 620 and 640) comprises a synaptic time-multiplexed (STM) neuromorphic network. In particular, the STM neuromorphic network may be substantially similar to the STM neuromorphic network 300 described above, in some embodiments. Moreover, the method 600 of neuromorphic model-based control may be transformed into a method of neural model-based control by substituting a neural model for the neuromorphic model described above, according to some embodiments.

Thus, there have been described examples of a neuromorphic model-based control system, a synaptic time-multiplexed neural model-based control system and a method of neuromorphic model-based control that employ feedback control of a model of a portion of a brain. It should be understood that the above-described examples are merely illustrative of some of the many specific examples and embodiments that represent the principles consistent with the principles described herein. Clearly, those skilled in the art can readily devise numerous other arrangements without departing from the scope consistent with the principles described herein as defined by the following claims.

What is claimed is:

1. A neuromorphic model-based control system comprising:
   a neuromorphic model to model a portion of a brain, the neuromorphic model comprising a neuromorphic network having a plurality of neurons and associated synapses implemented as hardware-based circuits; and
   a feedback controller comprising a control circuit to receive an output of the neuromorphic model and to provide a feedback control input to the neuromorphic model, the feedback control input to control a model state of the neuromorphic model.

2. The neuromorphic model-based control system of claim 1, wherein the portion of the brain to be modeled comprises basal ganglia, and wherein the neuromorphic model represents a basal ganglia model.

3. The neuromorphic model-based control system of claim 1, wherein the feedback controller is to implement one or more of a model predictive control system, a Kalman filter estimation, a Bayes filter and a particle filter.

4. The neuromorphic model-based control system of claim 1, further comprising a sensor to sense an output of the brain, wherein the feedback controller is further to modify the neuromorphic model according to the sensed output of the brain.

5. The neuromorphic model-based control system of claim 4, wherein the feedback control input is generated in response to deep brain stimulation within the brain in a vicinity of the portion of the brain to be modeled, and wherein the feedback controller is to modify the neuromorphic model according to the sensed output of the brain during the deep brain stimulation.

6. The neuromorphic model-based control system of claim 1, wherein the neuromorphic network comprises a synaptic time-multiplexed (STM) neuromorphic network.

7. The neuromorphic model-based control system of claim 6, wherein the STM neuromorphic network comprises:
  a neural fabric having nodes and switches to define inter-nodal connections between selected nodes of the neural fabric, each of the nodes comprising a neuron and an associated synapse of the plurality, an output of the neuron being connected to an output of the node and the associated synapse being connected between an input of the node and an input of the neuron; and
  a neuromorphic controller to form subsets of a set of the inter-nodal connections representing the neuromorphic model, each subset being formed during a different time slot of a plurality of time slots of a time multiplexing cycle of the STM neuromorphic network,
  wherein in combination, the inter-nodal connection subsets implement the neuromorphic model as a fully connected neural network within the STM neuromorphic network.

8. The neuromorphic model-based control system of claim 7, wherein the nodes of the neural fabric are arranged in a two dimensional (2-D) array of nodes, the neural fabric further having a plurality of signal routing channels, the nodes being bounded by the signal routing channels, and wherein some of the switches of the neural fabric connect between the signal routing channels and the nodes to facilitate communicating signals into and out of the nodes.

9. The neuromorphic model-based control system of claim 7, further comprising:
  a switch state memory to store a switch state of the switches; and
  a synapse conductance state memory to store a synapse conductance state of an associated synapse of the plurality,
  wherein the switch state to be stored and the synapse conductance state to be stored correspond to a time slot of the plurality of time slots of the time multiplexing cycle of the STM neuromorphic network.

10. A synaptic time-multiplexed (STM) neural model-based control system comprising:
  an STM neural network to model a portion of a brain; and
  a feedback controller comprising a control circuit to provide a feedback control input to the STM neural network, the feedback control input to control a model state of the STM neural network.

11. The STM neural model-based control system of claim 10, wherein the STM neural network comprises:
  a neural fabric having nodes and further having switches to define inter-nodal connections between selected nodes of the neural fabric; and
  a neuromorphic controller to form subsets of a set of the inter-nodal connections representing a fully connected neural network, each subset being formed during a different time slot of a plurality of time slots of a time multiplexing cycle of the STM neural network,
  wherein in combination, the inter-nodal connection subsets implement the fully connected neural network to provide the modeled portion of the brain.

12. The STM neural model-based control system of claim 11, wherein a node of the neural fabric comprises a neuron and a synapse, an output of the neuron being connected to an output of the node, the synapse being connected between an input of the node and an input of the neuron to provide an input signal to the neuron.

13. The STM neural model-based control system of claim 12, wherein the node further comprises a plurality of synapses, each synapse of the plurality of synapses being connected between the neuron and a different one of a plurality of inputs of the node.

14. The STM neural model-based control system of claim 12, wherein the synapse is configured to implement spike timing dependent plasticity.

15. The STM neural model-based control system of claim 10, wherein the portion of the brain to be modeled comprises basal ganglia, and wherein the STM neural network implements a basal ganglia model.

16. The STM neural model-based control system of claim 10, wherein the feedback controller is further to implement one or more of a model predictive control system, a Kalman filter estimation, a Bayes filter and a particle filter.

17. The STM neural model-based control system of claim 10, further comprising a sensor to sense an output of the brain, wherein the feedback controller is further to modify the STM neural network representing a modeled portion of the brain according to the sensed output of the brain.

18. A method of neuromorphic model-based control, the method comprising:
  receiving an output from a neuromorphic model of a portion of a brain, the neuromorphic model comprising a neuromorphic network having a plurality of neurons and associated synapses implemented as hardware-based circuits; and
  providing a feedback control input to the neuromorphic model using the received output, the feedback control input controlling a model state of the neuromorphic model.

19. The method of neuromorphic model-based control of claim 18, wherein the portion of the brain comprises basal ganglia, the neuromorphic model being a basal ganglia model.

20. The method of neuromorphic model-based control of claim 18, wherein the feedback control input is generated by one or more of a model predictive control system, a Kalman filter estimation, a Bayes filter and a particle filter.

21. The method of neuromorphic model-based control of claim 18, further comprising:
  receiving an output of a sensor, the sensor being connected to sense an output of the brain; and
  modifying the neuromorphic model according to the received output of the sensor.

22. The method of neuromorphic model-based control of claim 21, wherein the feedback control input is further provided in response to deep brain stimulation within the brain in a vicinity of the brain portion modeled by the neuromorphic model, and wherein the neuromorphic model is modified according to the received output from the sensor during the deep brain stimulation.

23. The method of neuromorphic model-based control of claim 18, wherein the neuromorphic network comprises a synaptic time-multiplexed (STM) neuromorphic network.

* * * * *